United States Patent [19]
Lin

[11] Patent Number: 5,253,160
[45] Date of Patent: Oct. 12, 1993

[54] CENTRALIZED CONTROL MEANS FOR MANIPULATING PLANT CONTROL SYSTEMS

[76] Inventor: Cheng S. Lin, c/o Hung Hsing Patent Service Center, P.O. Box 55-1670, Taipei, Taiwan

[21] Appl. No.: 801,496

[22] Filed: Dec. 2, 1991

[51] Int. Cl.$^5$ .............................. G06F 3/033
[52] U.S. Cl. .................... 364/188; 345/157; 345/163
[58] Field of Search ............. 364/188, 146, 474.22, 364/709.16; 340/709, 717, 710, 706; 341/31, 35

[56] References Cited

U.S. PATENT DOCUMENTS

| | | | |
|---|---|---|---|
| 4,926,326 | 5/1990 | McKinley | 340/717 |
| 4,935,728 | 6/1990 | Kley | 340/709 |
| 4,949,080 | 8/1990 | Mikan | 340/709 |
| 4,968,257 | 11/1990 | Yalen | 340/709 |
| 5,058,046 | 10/1991 | Lapeyre | 364/709.16 |
| 5,065,146 | 11/1991 | Garrett | 340/709 |

Primary Examiner—Jerry Smith
Assistant Examiner—Jim Trammell

[57] ABSTRACT

A centralized control rod is universally pivotally mounted on a rod holding board electrically connected with a CRT display device having a plurality of functional buttons formed on a knob portion of the control rod, whereby upon a biasing movement of the control rod and a depression of the functional buttons on the rod, any particular controller selection or screen display page selection or control mode changes can be simply manipulated directly on the centralized control rod by an operator's hand.

1 Claim, 5 Drawing Sheets

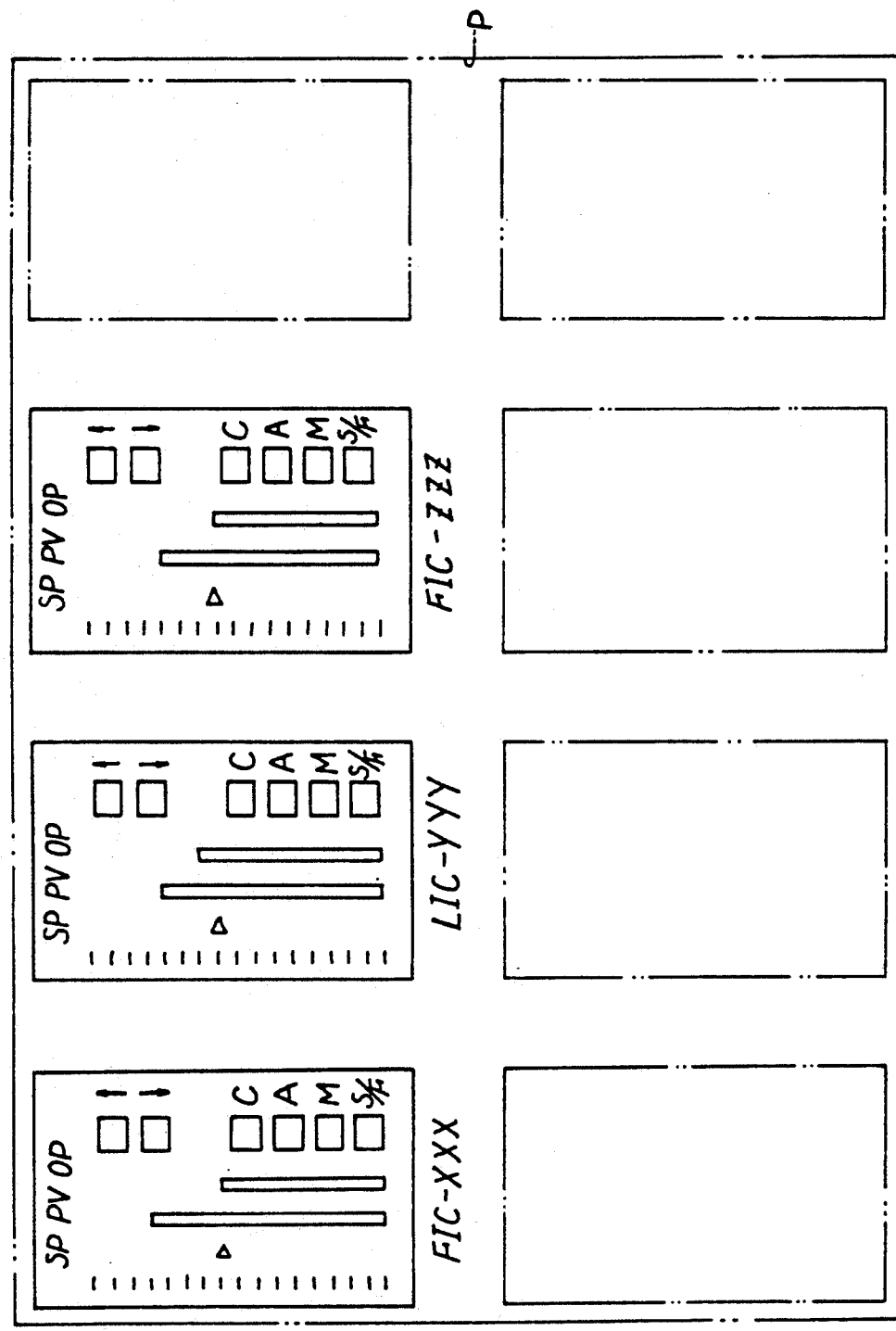

CENTRALIZED CONTROL MEANS FOR MANIPULATING PLANT CONTROL SYSTEMS

BACKGROUND OF THE INVENTION

A conventional process control input device as shown in FIG. 1 includes a keyboard K of a digital control computer having a plurality of keys formed on the keyboard, and a track ball T or a mouse M electrically connected with the computer, which may be used for a process control. However, in selecting, changing or manipulating the control details, an operator should depress so many keys on the keyboard or should further operate the track ball or mouse for any control changes or selections, thereby causing an operating inconvenience especially for a complex process control situation.

A conventional analog type process control device is shown in FIG. 2, which requires a very large control panel P for arranging the so many process analog controllers on the panel with each controller provided with a plurality of dedicated push buttons on the controller. If such a conventional control panel is used for controlling a factory having so many areas, the controller buttons will be widely arranged on a very large control panel, which may require more operators for manipulating the controllers with increasing labour and production cost or may cause human response delay for manually pushing buttons for each controller in operating the factory process control especially for treating an emergency operation case to easily cause accident.

It is therefore expected to disclose a simplified unique centralized control rod means for a process control systems operated by plant operators.

SUMMARY OF THE INVENTION

The object of the present invention is to provide a centralized control rod pivotally mounted on a rod holding board electrically connected with a CRT display device having a plurality of functional buttons formed on a knob portion of the control rod, whereby upon a biasing movement of the control rod and a depression of the functional buttons on the rod, any screen page selection among the available screens for the control displays or any particular controller selection among the controllers shown on the screen page or any control mode changes or any manipulatable variable change such as controller setpoint changes or controller output changes for the selected controller, all can be simply manipulated directly on the centralized control rod by an operator's hand with minimum movement by hand and fingers while gripping the rod, thereby speeding up and simplifying the control operation by plant operators.

BRIEF DESCRIPTION OF THE DRAWINGS

FIG. 2 shows a control panel provided with many process controllers for a conventional analog process control device.

DETAILED DESCRIPTION

Figure 1:
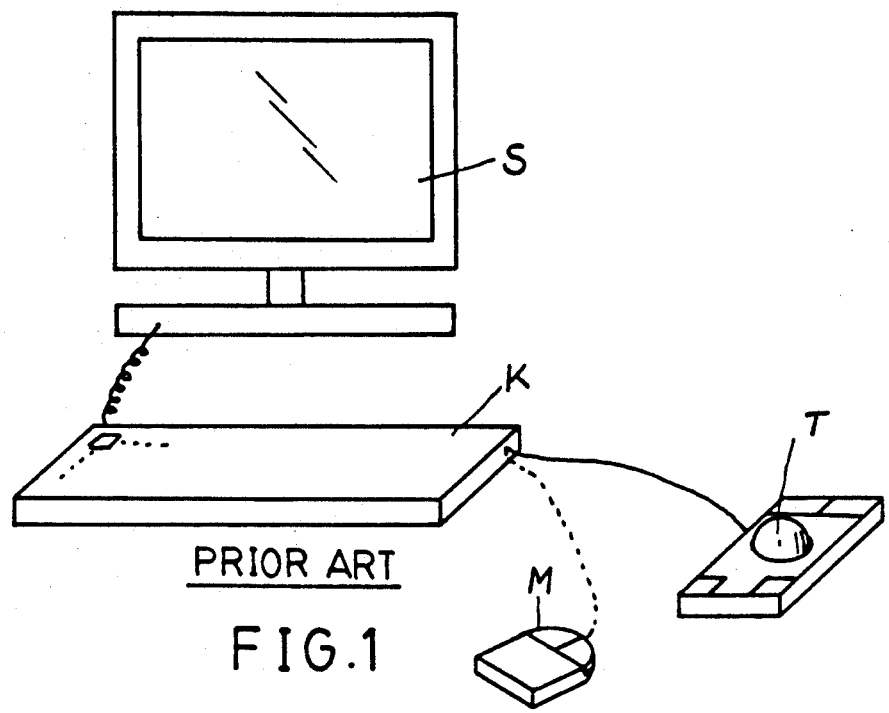
FIG. 1 shows a prior art of a conventional digital control input device.
Figure 4:
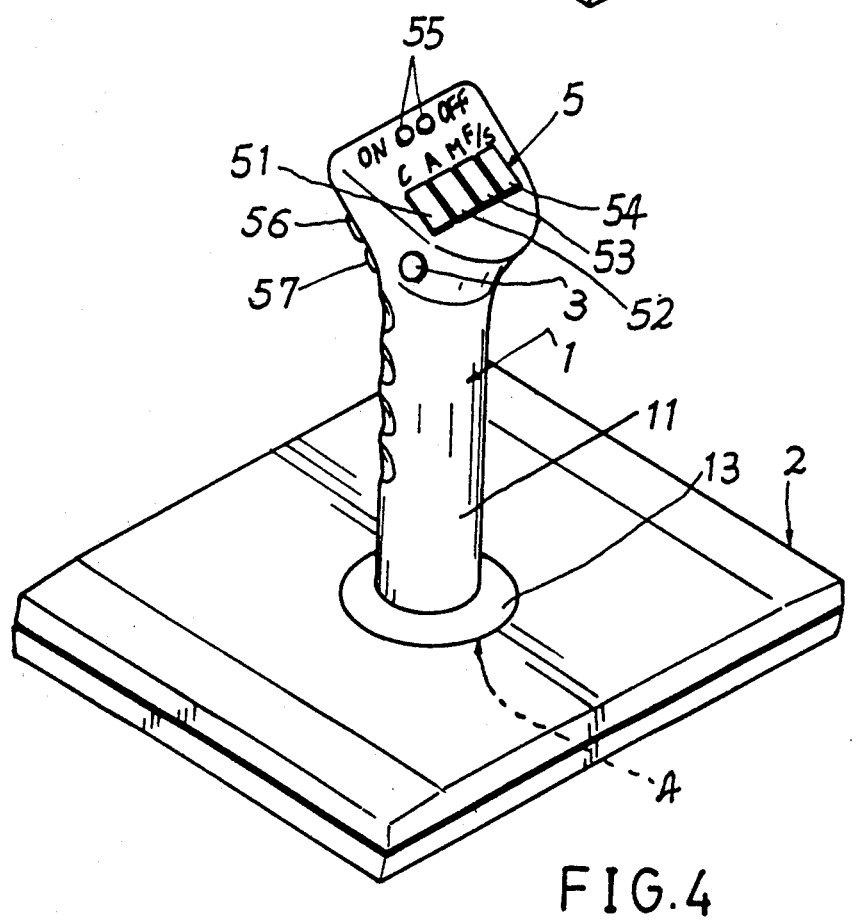
FIG. 4 is a perspective view of the control rod means of the present invention.

As shown in FIGS. 3-7, the present invention comprises: a control rod means 1, a rod holding board 2, a screen page activating means 3, a cursor positioning means 4, a control changing means 5, and a cathode-ray-tube (CRT) display means 6 of a computer.

The control rod means 1 includes a longitudinal rod 11 having a knob portion 12 formed on an upper portion of the rod 11 and a coupling base 13 generally spherical or semi-spherical shaped formed on a bottom portion of the rod 11 universally pivotally mounted in the rod holding board 2.

The coupling base 13 of the control rod means 1 is universally pivotally mounted in the rod holding board 2 by universally engaging a spherically-shaped socket 21 recessed in the board 2 having a plurality of spring retaining means 22 resiliently retaining the coupling base 13 of the control rod means 1 on the board 2.

Each spring retaining means 22 includes a coupling retainer 23 resiliently held in a spring recess 24 recessed in the socket 21 and slidably engageable with a spherical surface portion of the coupling base 13, and a tensioning spring 25 held in the spring recess 24 normally urging the coupling retainer 23 outwardly for resiliently holding the coupling base 13 of the control rod means.

Other modifications or mechanisms for universally coupling the base 13 of the control rod means 1 with the holding board 2, which are not limited in this invention, may be made by those skilled in the art.

The screen page activating means 3 includes a screen page command button mounted on the knob portion 12 of the control rod means 1 for operatively accessing a screen page or changing a screen page currently shown on a screen 61 of the CRT display means 6 of a computer to a new screen page retrieved from a display access architecture (not shown) having a plurality of group levels and a plurality of subgroup pages subjected to each group level of the display access architecture of the display means. The CRT display means 6 includes a transmission cable 62 connected between the rod means 1 and the display means 6 for transmitting electronic signals therebetween.

Figures 6, 7:
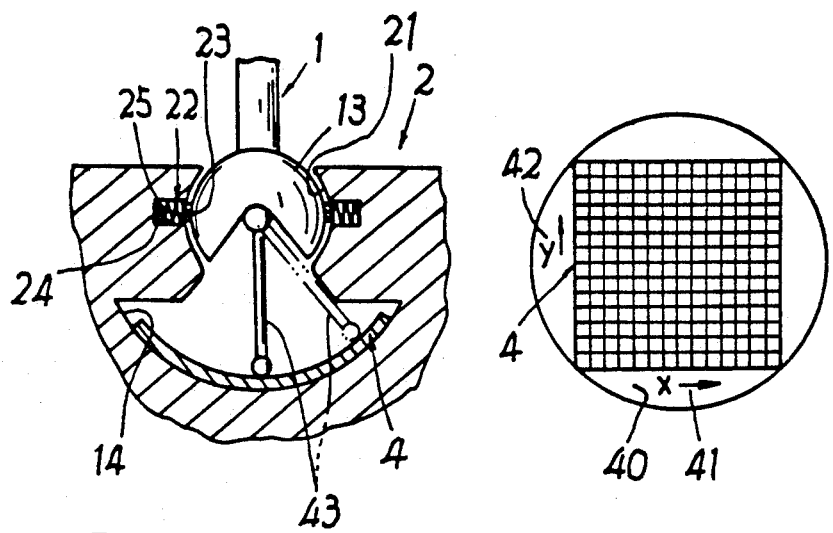
FIG. 6 is a partial sectional drawing of the present invention.
FIG. 7 shows a coordinate grid of a cursor positioning means in accordance with the present invention.
Figure 5:
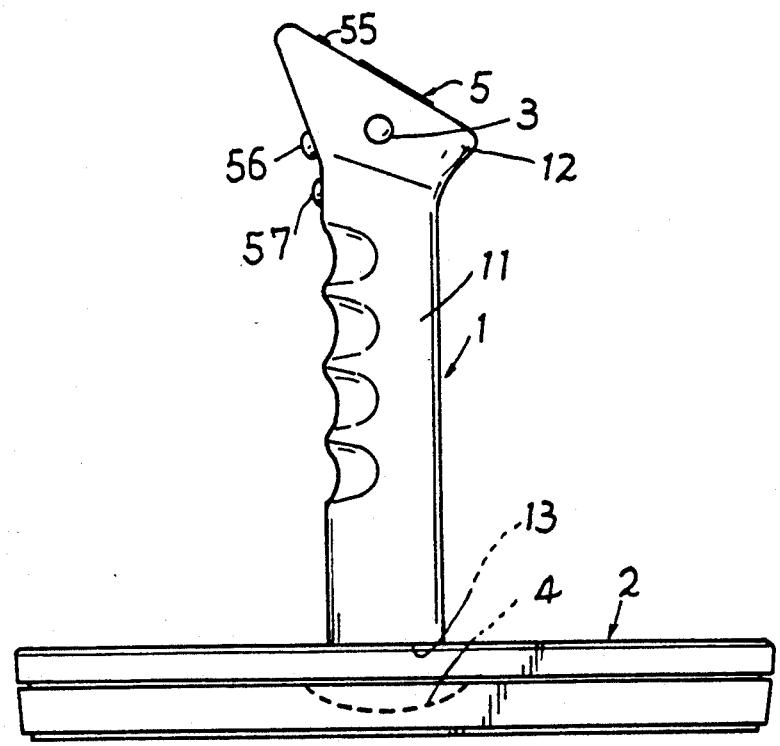
FIG. 5 is a side view of the control rod means of the present invention.

The cursor positioning means 4 as shown in FIGS. 6, 7 includes: a coordinate grid 40 generally partially spherical shaped positioned under the coupling base 13 of the control rod means 1 showing a matrix address formed by a X-axis 41 and a Y-axis 42, corresponding to an address shown on the screen page and the display means 6, and an addressing probe 43 secured to the coupling base 13 of the control rod means 4 movably touching on the coordinate grid 40 for operatively moving and positioning a cursor on the screen 61 of the CRT display means 6 for selecting a particular controller and for selecting a specific page by transmitting signals from the cursor positioning means 4 towards the CRT display means 6 through a transmission cable 62 connected between said cursor positioning means 4 and said CRT display means 6.

The control changing means 5 mounted on the knob portion 12 of the control rod means 1 includes: a computer or cascade control button (C) 51 for manipulating a computer (or cascade) control mode, a local automatic control button (A) 52 for manipulating a local automatic control mode, a manual control button (M) 53 for manipulating a manual control mode, a ramping rate selection button (F/S) 54 for adjusting a fast or slow ramping speed for selected control variable to be changed, two on-off control buttons 55 for manipulating on-off control, a variable-increasing command button 56 for setting increased value of a controlled variable, and a variable-decreasing command button 57 for setting decreased value of a controlled variable.

Figure 3:
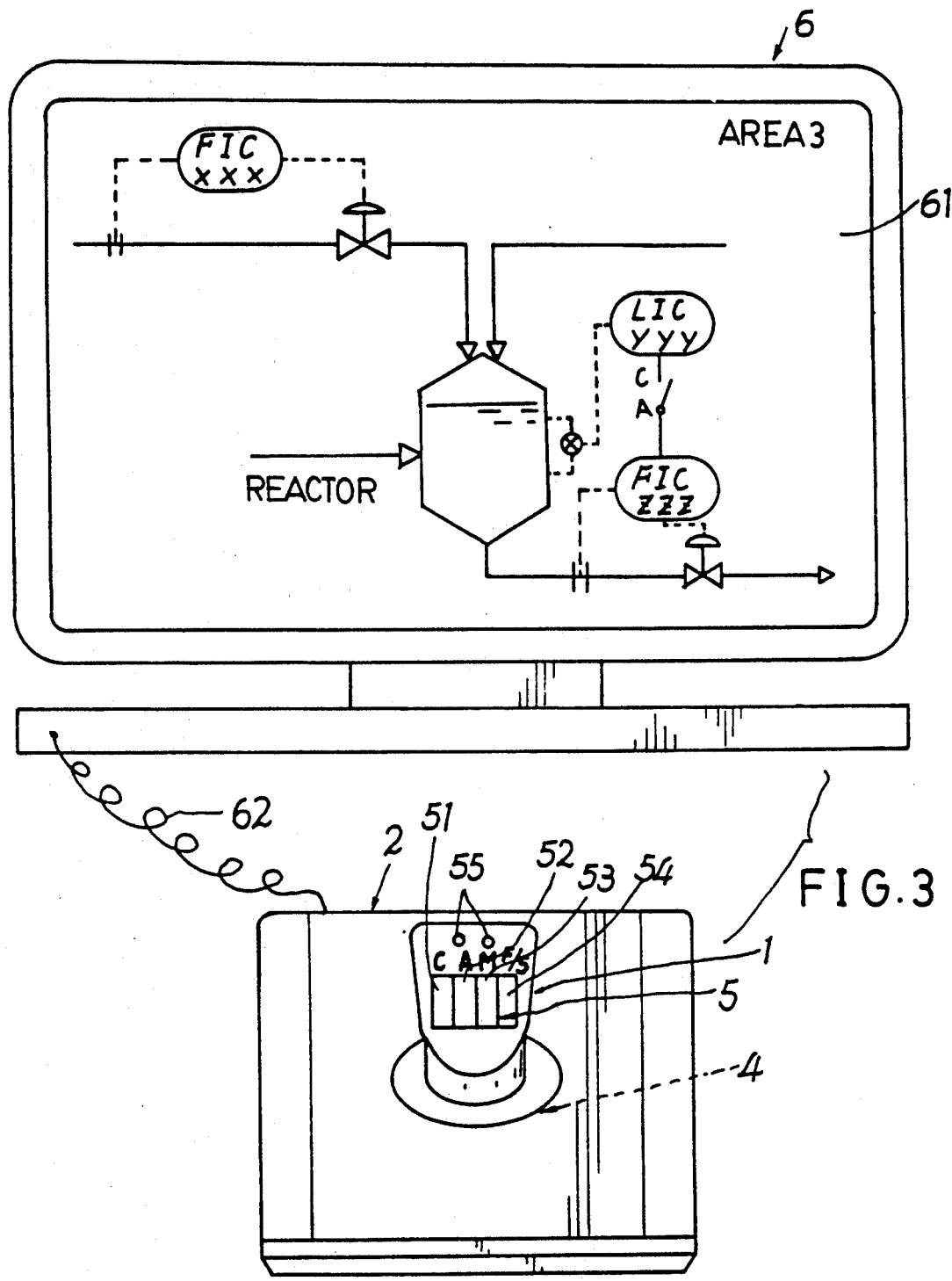
FIG. 3 is an illustration of the present invention.
Figure 8:
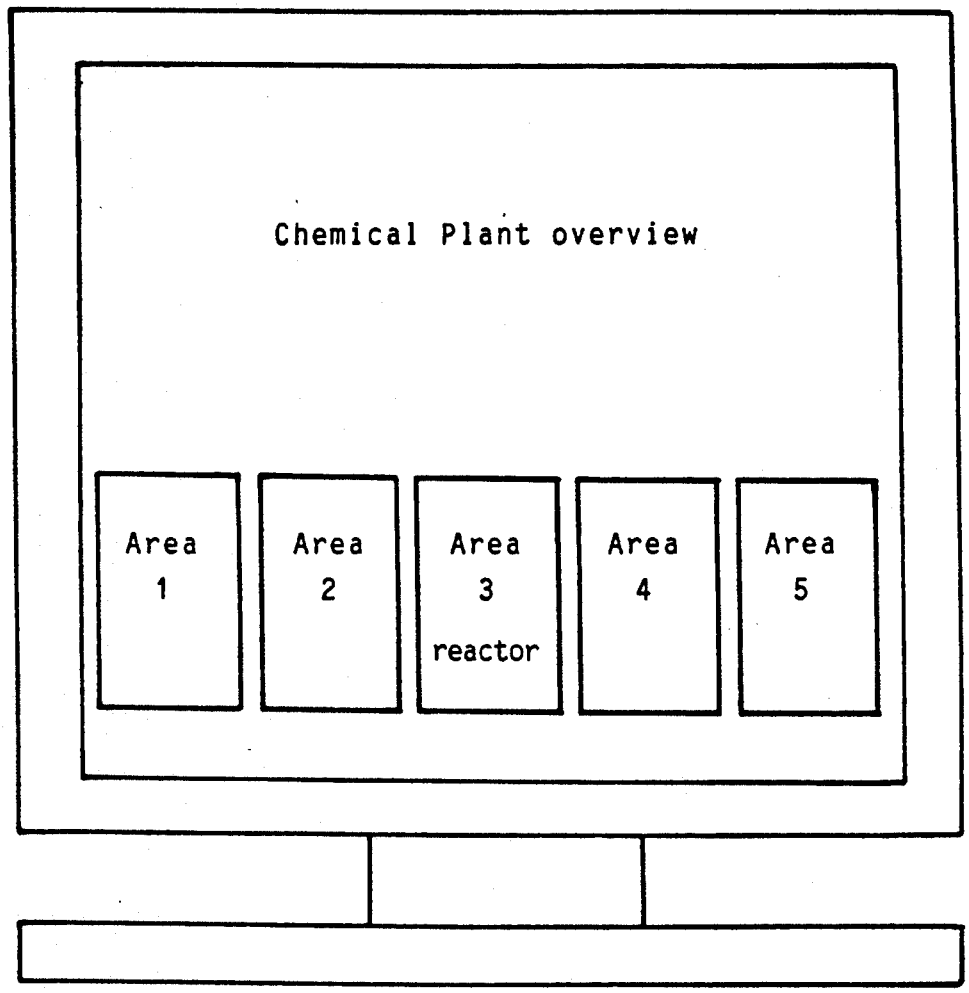
FIG. 8 shows an example of chemical plant overview in accordance with the present invention.

When using the present invention for controlling a chemical plant having 5 processing areas as shown in FIG. 8, for instance, with each processing area constructed with detailed graphics in each screen page such as shown in the screen display 61 of FIG. 3, any controller on each processing area, for example, can be selected by the centralized control rod operation to change the controller setpoint in order to operate the entire chemical plant. Assume that the reactor is resided in Area 3, and controller LIC-YYY for reactor level control in Area 3 is to be selected for control manipulation by an operator, the control rod operation by the operator should position the cursor to the area 3 of the chemical plant overview display and push the button 3 on the control rod 1. The area 3 page will be shown on the new screen display. Assume that the detailed graphic display for area 3 is represented as shown in CRT screen 61 of FIG. 3, the control rod should be moved so that cursor moved to the LIC-YYY tag name location and push the button 3 again to select the controller LIC-YYY. Once LIC-YYY controller is selected, the subsequent control changes can be operated by using the function buttons 51, 52, 53, 54, 56, or 57 to achieve the necessary changes. As to the pump start/stop operation, the on-off buttons 55 can be utilized.

Now, if the control mode is selected to be a manual control, the button 53 of the control changing means 5 is depressed for a manual control of the LIC to be in active manual control mode and the level controller output variable is adjusted by depressing the button 56 or 57 for increasing or decreasing the output of the level controller of the reactor until a satisfactory plant operation is completed.

The present invention is provided to combine two types of input operations such as a truck ball or key board type for digital control and a panel type analog control using the dedicated function buttons, and all the necessary control manipulations are centralized in the single centralized compact control rod means 1.

Accordingly, this invention provides a more compact control device which can be conveniently manipulated merely by an operator's single hand or fingers with minimum movement, to be superior to a conventional digital control or analog control device.

The present invention may be applicable in a factory automation, process automation areas and process control for any continuous or batch processes, and is not limited for its uses.

I claim:
1. A centralized control means comprising:
a control rod means pivotally mounted on a rod holding board adapted to be manipulated by an operator's single hand, including a longitudinal rod having a knob portion formed on an upper portion of the rod and a coupling base generally spherical shaped formed on a bottom portion of the rod universally pivotally mounted in the rod holding board, said coupling base of the control rod means universally pivotally mounted in the rod holding board by universally engaging a spherically-shaped socket recessed in the holding board having a plurality of spring retaining means formed in said board for resiliently retaining the coupling base of the control rod means on the board, each said spring retaining means including a coupling retainer resiliently held in a spring recess recessed in the socket and slidably engageable with a spherical surface portion of the coupling base, and a tensioning spring held in the spring recess normally urging the coupling retainer outwardly for resiliently holding the coupling base of the control rod means in said board;
a plurality of functional buttons of a screen page activating means, a cursor positioning means and a control changing means mounted on said control rod means;
a cathode-ray-tube or CRT display means having a screen and a transmission cable connected between said control rod means and said display means;
said screen page activating means operatively accessing and changing a screen page currently shown on said display means to a new screen page stored in a display access architecture comprised of a plurality of pages;
said cursor positioning means operatively moving and positioning a cursor on said screen of said display means for selecting a particular controller and selecting a specific page, said cursor positioning means including: a coordinate grid generally partially spherical shaped positioned under the coupling base of the control rod means showing matrix address formed by a X-axis and a Y-axis corresponding to an address shown on said screen page and said display means, and an addressing probe secured to the coupling base of the control rod means movably touching on the coordinate grid for operatively moving and positioning a cursor on the screen of the CRT display means for selecting a particular controller and for selecting a specific page by transmitting signals from the cursor positioning means towards the CRT display means through said transmission cable connected between said cursor positioning means and said CRT display means; and
said control changing means operatively selecting a plurality of control modes and manipulating control variable changes, said control changing means mounted on the knob portion of the control rod means including a computer control button for manipulating a computer control mode, a local automatic control button for manipulating a local automatic control mode, a manual control button for manipulating a manual control mode, a ramping rate selection button for adjusting a fast or slow ramping speed for selected control variable to be changed, two on-off control buttons for manipulating on-off control, a variable-increasing command button for setting increased value of a controlled variable and a variable-decreasing command button for setting decreased value of a controlled variable.

* * * * *